June 27, 1967  P. E. AMBROSE ETAL  3,328,222
METHOD OF MAKING A GIRDLE

Original Filed Feb. 7, 1962  3 Sheets-Sheet 1

INVENTOR
Paul E. Ambrose
William J. Dorsey &
Peter D. Kaspar

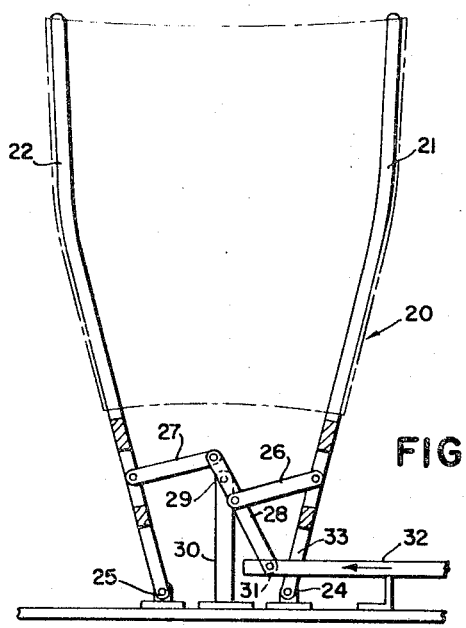
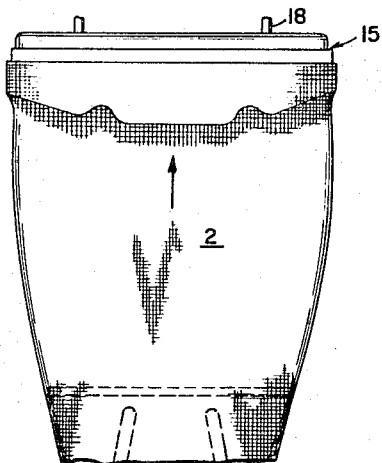
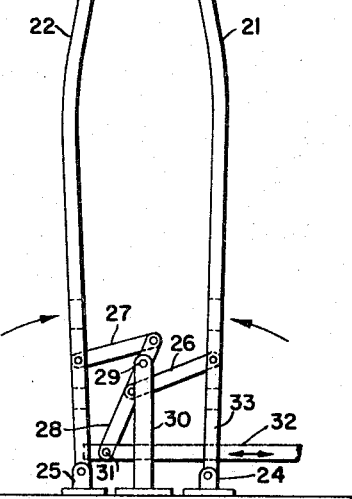
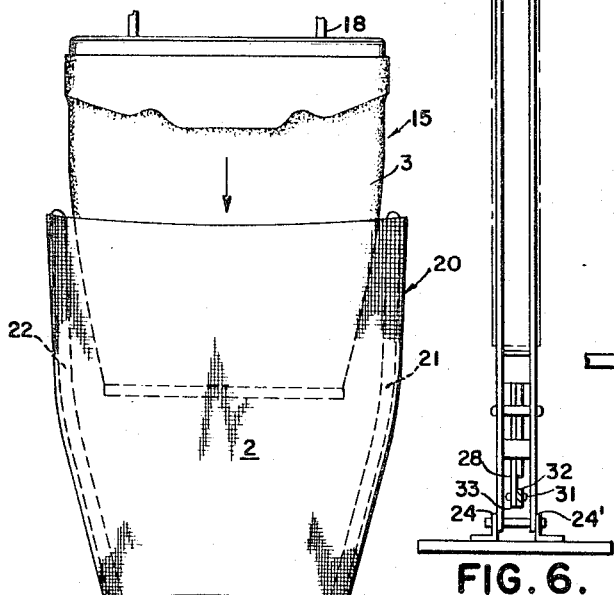
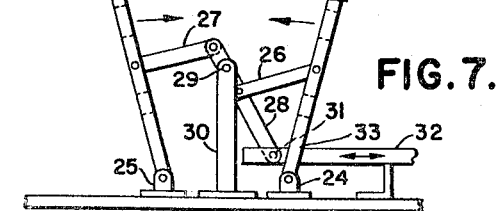

INVENTORS
Paul E. Ambrose
William J. Dorsey &
Peter D. Kaspar

United States Patent Office 3,328,222
Patented June 27, 1967

3,328,222
METHOD OF MAKING A GIRDLE
Paul E. Ambrose, William J. Dorsey, and Peter D. Kaspar, all of Dover, Del., assignors to International Playtex Corporation, a corporation of Delaware
Original application Feb. 7, 1962, Ser. No. 170,314, now Patent No. 3,219,039, dated Nov. 23, 1965. Divided and this application Aug. 11, 1965, Ser. No. 491,853
8 Claims. (Cl. 156—229)

This is a division of application Ser. No. 170,314, filed Feb. 7, 1962, which application is a continuation-in-part of application Ser. No. 91,218, filed Feb. 23, 1961, now abandoned.

Our new girdle is made of a seamless rubber sheath and a seamless stretchable fabric sleeve which is elastically bonded throughout to the inner surface of the seamless rubber sheath to constitute its cloth lining. The elastic bonding of the two materials to each other in their seamless tubular form is accomplished by controlled penetration. We thus achieve bonding which is everywhere both strong enough so the lining does not peel off in service use, and elastic enough so the waist of the girdle can easily be stretched over the hips when the girdle is being put on or taken off.

The seamless rubber sheath is first made to most—but not all—of its final thickness by depositing latex onto a form and coagulating it into a solid, no longer fluid, sheath. Then a final layer of latex is deposited onto the surface of the solid rubber sheath. This final layer is only a few thousandths of an inch thick.

Meanwhile a seamless knit sleeve is placed on a transfer rack which holds it stretched out. This sleeve, which will be bonded to the rubber sheath to constitute its lining, is of stretchable fabric made of undulating interlocked loops of yarn, which yarn is itself made of stretchable fibers. The sleeve is stretched out to a size such that the sleeve on its rack and the sheath on its form can be nested without touching each other.

While the surface layer of latex on the rubber sheath is semi-fluid and tacky, the seamless knit sleeve on its rack is brought adjacent to but spaced from the tacky-surfaced sheath on its form. Then the rack is so manipulated that the sleeve moves radially in from all sides into contact with the semi-fluid tacky surface of the rubber sheath. Since the contact is made by only radial movement of each portion of the sleeve as it comes into contact with the semi-fluid surface layer, a uniform penetration and adherence can be obtained. This avoids any wiping of the semi-fluid layer off of some spots, which would cause weak adhesion and later peeling. It also avoids pushing the semi-fluid rubber layer up into mounds where it would too deeply immerse the loops of the knit sleeve and lock them against stretching. After the knit sleeve has moved radially into contact with the semi-fluid layer it is subsequently pressed against the sheath to insure immersion of the fabric up to approximately the depth of the semi-fluid layer. This pressing may be done by rollers or other suitable device provided that the pressure must be exerted substantially perpendicular to the surface.

The superiority of the girdle which we have invented is apparent, since a solid rubber body gives superior control of body contours and has longer life; a knit fabric lining gives superior feel and absorbency; and a seamless garment, without any seam in the rubber sheath or in the fabric lining, is more comfortable, lasts longer, and avoids the welting of the body and the wrinkling of the garment which seams produce. Never before have all these advantages been present in a single garment, nor has it been known how they could all be successfully provided at once in a single garment.

More detail about the controlled penetration to achieve the correct elastic bonding of the lining to the rubber sheath will be given, after a description of how the lining sleeve is put onto the rubber sheath which is on a form and has a semi-fluid final layer of latex on it.

FIGURES 5 and 6 are front and side elevations, respectively, of a transfer rack used for putting the fabric sleeve onto the rubber sheath.

FIGURE 7 shows a dipping form with a deposited latex rubber sheath thereon, and carrying a final layer of semi-fluid latex, with the form about to be inserted into the tubular fabric sleeve which is stretched on the rack.

FIGURE 8 shows the transfer rack in its collapsed position, with the sleeve transferred to the rubber sheath and the form retracted from the rack.

Figures 1, 2, 3, 4:
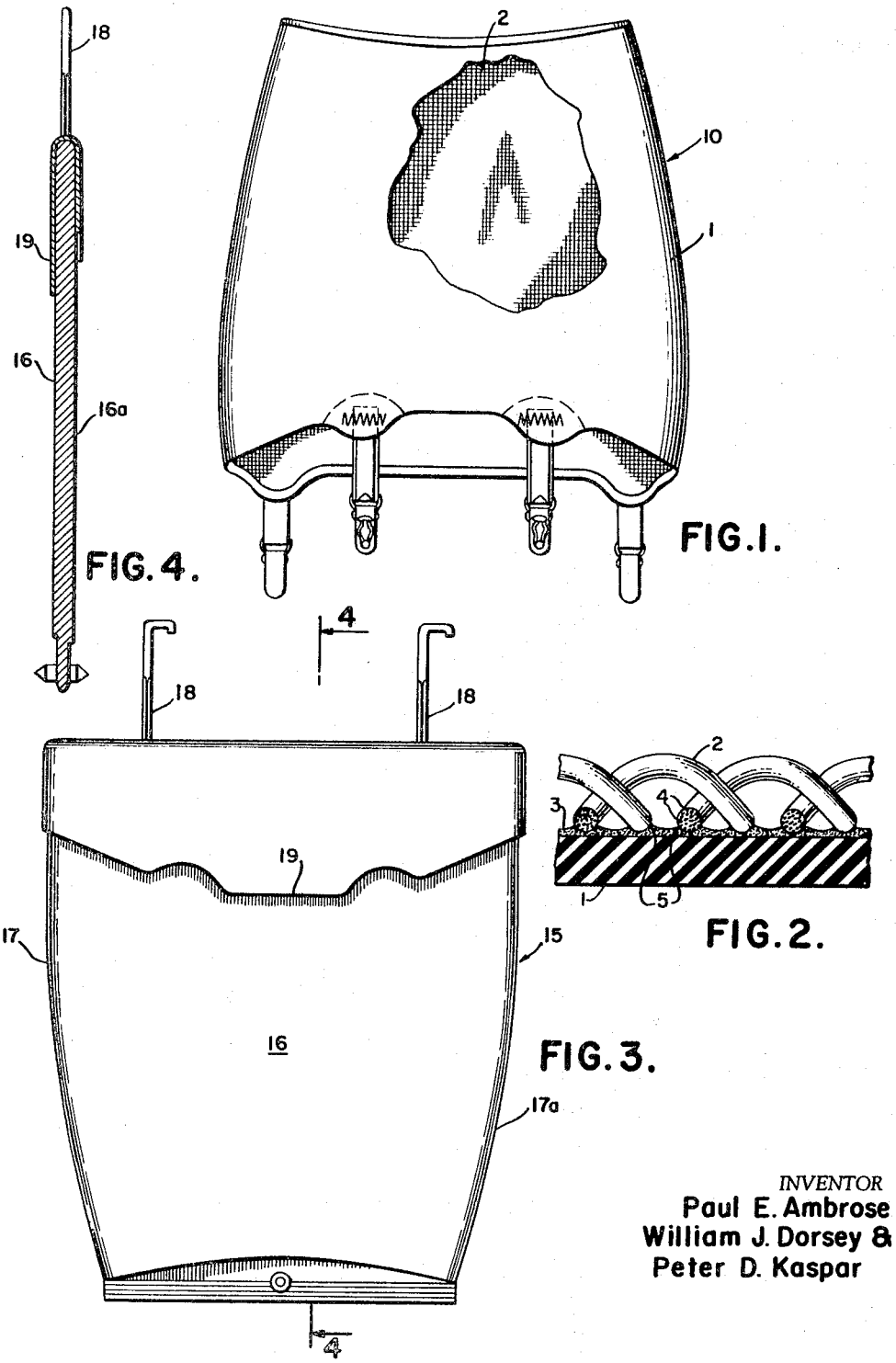
FIGURE 1 is a front elevation, with parts broken away, of a seamless rubber girdle with a seamless fabric lining integrally bonded to the inside surface of the rubber sheath.
FIGURE 2 is a schematic cross-sectional enlargement of the rubber sheath with fabric lining elastically bonded to it.
FIGURE 3 is a front elevation of a dipping form suitable for use in the invention when the rubber sheath is formed by dipping into latex.
FIGURE 4 is a cross-section view of the dipping form taken on line 4—4 of FIGURE 3.

FIGURE 1 shows a finished girdle 10 of our invention. It has an outer seamless rubber sheath 1 and, elastically bonded to the inner surface thereof, a seamless lining 2 of stretchable fabric. For convenience, in some of these figures the knit seamless lining is represented simply by cross-hatching. The girdle may incorporate many additional features of reinforcement and improvements, one example being the garters seen in FIGURE 1.

The finished girdle has a shape approximating the shape of the female torso, and a size somewhat less than the size of the wearer, so it will exert a slimming and controlling constrictive force. It must however be quite elastic so it will not bind and so the smaller waist portion can be stretched over the hips. These girdles are made in a few discrete sizes, by size steps. From the foregoing facts it follows that to be successful these girdles must have fairly uniform elasticity over a considerable range of stretch.

The rubber sheath by itself meets these elasticity requirements. The knit liner of Helanca or other stretch yarn also by itself meets these requirements. But when the fabric liner is embedded to more than a very limited depth in the latex its stretch is locked because the latex fastens the fibers together at their intersections. A composite of rubber sheath and stretchable fabric liner deeply embedded in the rubber has very little stretch and cannot make an acceptable girdle.

On the other hand, the stretchable fabric lining must be bonded strongly enough to the rubber sheath so that it will not delaminate, or pull away from the surface of the rubber sheath, throughout repeated wash and wear cycles. The greater the penetration of the adhesive into the fabric lining the greater the adhesion of the lining to the rubber sheath. Thus the adhesive bonding must not be too shallow and it must not be too deep. To stay between these two rather close limits throughout when applying a seamless lining to a seamless sheath requires special expedients.

FIGURE 2 shows schematically a rubber sheath 1 about 20 thousandths of an inch thick and knit loops of the lining 2, about 30 thousandths of an inch thick. The final layer of latex 3 is just a few thousandths of an inch thick and it elastically bonds the knit loops to the sheath by their being immersed just a few thousandths of an inch at each loop of the yarn on that surface of the lining which is next to the rubber sheath.

The rubber sheath may be made by dipping. For the basic concepts as to the rubber sheath and how to make it by dipping see U.S. Patent 2,360,736 to A. N. Spanel. When the rubber sheath is built up by successive dippings into a tank of liquid latex a form 15 may be used, which has flat faces 16 and 16a and rounded side edges 17 and 17a. Hangers 18 are provided for suspending the form, and it has a raised margin 19 at its upper end for outlining the bottom of the girdle film.

Figure 9:
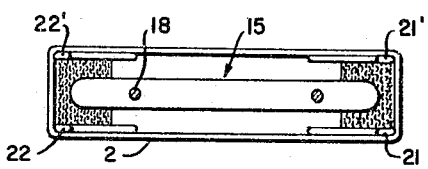
FIGURE 9 is a plan view corresponding to FIGURES 6 and 7, showing the transfer rack holding the lining about, but spaced from, the dipping form on which is carried the rubber sheath coated with semi-fluid latex.

Referring to FIGURES 5 and 6, a transfer rack 20 is constructed with two pairs of spaced parallel arms 21–21' and 22–22' each pair being separately and pivotally mounted on their bases 24–24' and 25–25', respectively, to bell crank lever 28 pivoted at 29 to support 30. The bell crank is pivoted at 31 to operating shaft or rod 32 which is powered by a motor through suitable gearing (not shown), the shaft passing through the space 33 between the pair of arms 21–21'. The bell crank operates to move the pairs of arms 21–21' and 22–22' toward and away from each other in vertical planes by its oscillation caused by reciprocating the shaft 32. FIGURE 9 is provided to show the form-encircling relationship of the lining 2 when it is mounted in stretched condition on the transfer rack 20.

As seen in FIGURE 7, the lining is placed over the pairs of arms 21–21' and 22–22', and the transfer rack is operated to hove the arm pairs apart and stretch the lining to a size larger than the form 15. The form is then lowered, as indicated by the arrow in FIGURE 7, inside the stretched liner, and the transfer rack is operated to move arm pairs 21–21' and 22–22' inwardly toward each other. This allows the side edge portions of the lining to contact the side edges of the rubber sheath by travel which is substantially perpendicular to those surfaces.

The arm pairs 21–21' and 22–22' of the transfer rack move inwardly between the lining 2 and the flat faces 16 and 16a of the form to the position shown in FIGURE 8 by further operation of the bell crank lever 28. The stretched lining tries to pull in toward its original size. Then the form 20 is raised as indicated by the arrow in FIGURE 8. The lining moves up with the form, clinging to its side edges and slipping easily along the smooth arms 21, 22, and pulling in over their top ends to move perpendicularly into contact with the flat faces of the coated rubber sheath.

Figure 10:
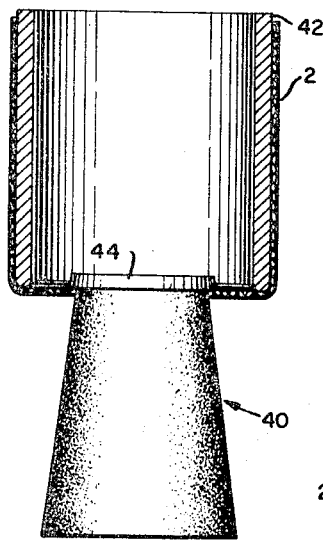
FIGURES 10, 11 and 12 show a form which is a figure of revolution, and a cylindrical transfer rack to go with that form, FIGURES 10 and 11 being front elevations partly in section and FIGURE 12 being a plan view with the sleeve omitted.
Figure 11:
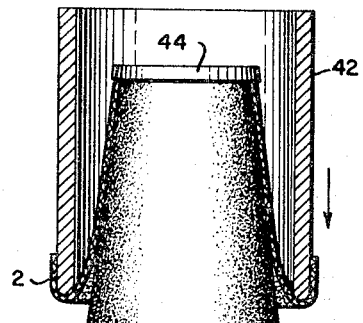
Figure 12:
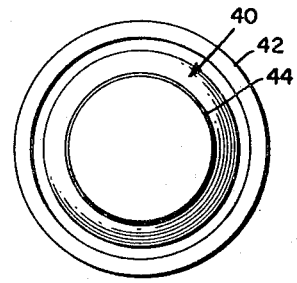

With some ways of making the rubber sheath, for example, making it by spraying latex onto a form, it is desirable to use a form which is a figure of revolution. FIGURES 10 and 11 illustrate in front elevation, and FIGURE 12 in plan view, a form 40 in the shape of a frustum of a cone. This form has had a rubber sheath formed on it and solidified, and a final layer of latex applied which is in a semi-fluid condition. In this case, the stretchable sleeve 2, which again has a circumference when at rest smaller than that of the form 40, is stretched onto the outside of a hollow cylindrical transfer rack 42. This rack is brought into coaxial relation with form 40.

In the mode illustrated in FIGURES 10 and 11, one end of the sleeve is clamped to the end of the form by ring 44. Now the transfer rack is advanced over the form, coaxially with it. The sleeve slides past the bottom edge of the transfer rack, and ends up positioned on the form as shown in FIGURE 11, under a slight longitudinal stretch to help avoid occurrence of wrinkles.

Figure 13:
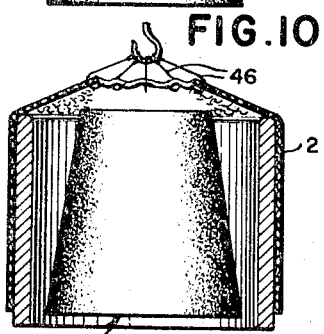
FIGURES 13 and 14 are front elevations partly in section, of a similar form and transfer rack but illustrating another mode of application of the lining.
Figure 14:
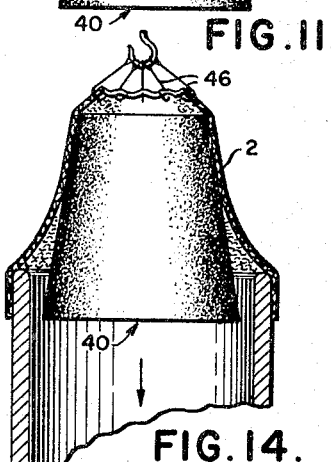

Another mode of carrying out our method is illustrated in FIGURES 13 and 14. There the unstretched end of the sleeve 2 is secured as by hooks 46, while the rest of the sleeve is stretched over the transfer rack 42. Now as the transfer rack is pulled down as indicated by the arrow in FIGURE 14 (or the form and the means holding the sleeve are pulled up) the sleeve contracts inwardly and makes contact with the tacky surface of the rubber sheath on the form. It will be noted in all these modes of applying the liner, that its actual travel at the moment of making contact with the semi-fluid layer on the surface of the rubber sheath is substantially perpendicular to that surface, so as to obtain the uniform critical depth of elastic bonding of lining to rubber sheath.

The tendency of a knit sleeve of stretchable yarn to pull back into its rest position when released is sufficient to bring the sleeve from the transfer rack into contact with the rubber sheath. It is not however sufficient to immerse virtually all the fabric loops at the adjacent face of the lining to substantially the depth of the semi-fluid adhesive layer. To accomplish this, pressing is required. This pressing may be done with rollers or any other suitable means.

Figure 15:
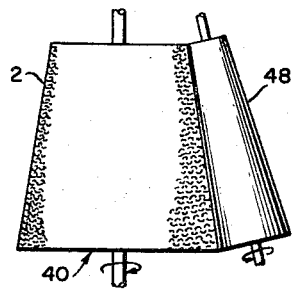
FIGURE 15 is a front elevation of one form of roller used in pressing the lining into the semi-fluid final layer of latex.

In FIGURE 15 one arrangement for pressing is illustrated diagrammatically. Here the form 40 carries the rubber sheath with the sleeve 2 in position and making contact with the semi-fluid adhesive layer. A roller 48 rolls along the surface of the form, pressing the sleeve into the adhesive layer to the requisite extent. This roller is preferably quite soft, being made for example with foam rubber. It is desirable that the roller should only push perpendicularly upon the lining at all times, and that it simply roll upon it, not sliding or pushing. In the arrangement shown in FIGURE 15 the roller is, like the form, a frustum of a cone. Its taper is proportional to that of the form, so that the surfaces roll upon each other without any portion sliding or pushing tangentially.

Figure 16:
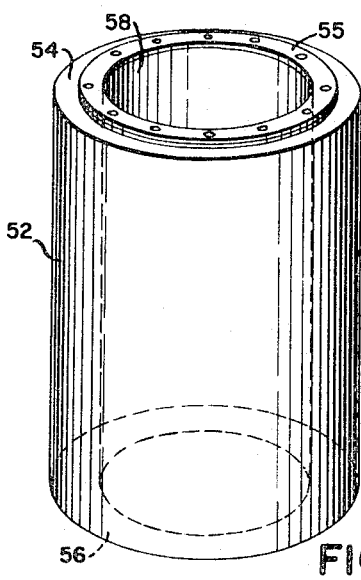
FIGURE 16 is a perspective view of a tubular diaphragm and its associated housing. This is particularly useful for pressing the lining onto the sheath when the form has compound curvature.
Figure 17:
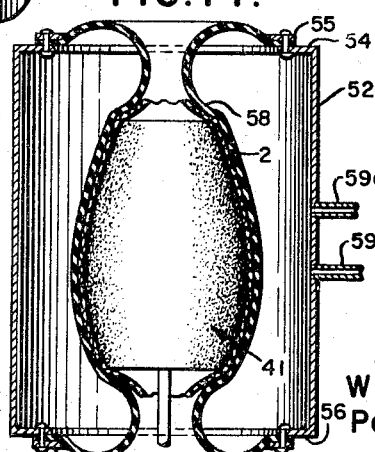
FIGURE 17 is a sectional view of same with the diaphragm inflated.

FIGURE 16 illustrates a pressing drum by means of which we can apply substantially uniform pressure over the surface of the liner to press it smoothly and uniformly against the rubber sheath. FIGURE 17 illustrates the operation of this drum. This drum is particularly useful when the form is a figure of revolution with compound curvature, as seen at 41 in FIGURE 17.

A drum 50 is first provided. It may be cylindrical or otherwise as desired. Its outer wall 52 has top and bottom annular end flanges 54 and 56. A tubular diaphragm is placed inside the drum. This diaphragm may be a rubber tube 58, which preferably has a rest diameter smaller than the smallest diameter of the form that carries the rubber sheath. The ends of this tube are stretched to a larger circumference to match the inner circumference of the annular end flanges 54 and 56. The tube is solidly secured in an airtight manner to the inner edge of the annular end flanges, by any suitable clamping rings 55 or other means. A partial vacuum is now drawn upon the annular space defined by the drum and the rubber tube, through connection 59a. This partial vacuum will enlarge the hour-glass waist of the rubber tube, so the rubber tube becomes as large in the center as at the ends.

The form, which carries the rubber sheath deposited upon its outside surface and about that a fabric sleeve, is now inserted into the empty space within the enlarged rubber tube. Then the vacuum connection is shut off, and compressed air is introduced through connection 59b. The drum, being of substantial metal, is not changed. However, the rubber tube at its inner surface is caused to move inwardly by the air pressure in back of it. As the air pressure is increased the rubber tube completely contacts the sleeve over the rubber sheath on the form, and presses the sleeve radially inwardly upon the sheath. If, as will normally be the case, a coating of tacky latex or other adhesive is over the surface of the rubber sheath and in contact with the inner surface of the fabric sleeve, this inward pressure will embed the innermost portions of the fabric sleeve into said adhesive and help effect a strong uniform bond.

As soon as there has been sufficient dwell for the purpose, the air pressure in the annular drum space is released and a partial vacuum is again pulled, whereupon the form bearing the rubber sheath and pressed-on lining is withdrawn axially.

While many variations in size, shape and disposition of the drum and its rubber tube may be made, the rubber tube will in accordance with the invention be surrounded by an air space such that air pressure in that space will tend to compress the tube toward its central axis, and preferably the rest diameter of the tube will be less than that of the member to be pressed. Also the pressure, being of a fluid nature wherein the pressure per unit area is the same throughout, will always be substantially uniform over the surface of the article to be pressed. Slight differences in the stretch of the tube will not affect this significantly. Any tendencies for larger differences can be overcome by differential dimensioning of the rest shape of the tube, and also by making the tube of material having a relatively low resistance to stretch.

After the lining is suitably pressed on, the composite article is dried and the rubber cured, by conventional means for example hot air oven curing at 230° C. for 45 minutes. Various finishing operations are performed on the girdle, such as trimming, sewing on garter tabs if not integral with the rubber film, sewing elastic fabric facing on the borders, perforating, etc. At some point it is turned inside out, so the lining is on the inner surface of the finished girdle.

*Rubber or latex.*—Wherever herein the term "rubber" or "latex" is used, it should be understood that all their forms that can be used in the present invention are included, including other elastomers such for example as polyurethane.

*Depositing the latex.*—The latex may be deposited upon the form to constitute the solid body of the rubber sheath, and the final layer may be deposited thereon to constitute the adhesive layer, by any suitable means. One suitable means is dipping a form into a bath of latex and withdrawing it and allowing the deposited film to set up. This is repeated as many times as may be needed to build up the desired thickness. Again, the latex may be sprayed onto a form, with suitable relative scanning as between the spray gun and the form. In either case a solution of rubber in a solvent may be used in place of a suspension of rubber in water.

*The adhesive layer.*—This layer has been referred to as latex, and it desirably is latex of the same composition as the body of the rubber sheath. However a different composition or a different suitable adhesive elastic material may be used to constitute the final layer for securing the lining to the sheath. Preferably the adhesive layer is deposited on the rubber sheath as has been described, but it could be deposited on the adjacent surface of the sleeve, or two adhesive components could be deposited, one on each of those two surfaces. The mode of application of the sleeve illustrated in FIGURES 10 and 11 is conveniently adapted to deposit of a material for adhesion upon the surface of the sleeve which will be adjacent the rubber sheath.

*The sleeve.*—The sleeve which will constitute the lining of the girdle is seamless and is knit in a manner to constitute a continuous tube of uniform diameter. It is cut to suitable lengths for application of the girdle, with some trim excess at both ends. Its rest diameter is preferably smaller than the smallest diameter of the girdle, to avoid wrinkling. It is made of stretch fabric, the stretch being imparted both from the loop geometry of the knit fabric and from the nature of the yarn. The yarn is stretchable, such for example as Helanca. The sleeve should be stretchable longitudinally as well as circumferentially. It should have rugged wear properties, but be soft and absorbent. The sleeve should have enough elastic recovery so that when it has been stretched on the transfer rack to a size larger than the rubber sheath it will immediately contract, as it is disengaged from the transfer rack, to pull itself into contact with the rubber sheath on its form. In fact a spring snap is desirable so that production step can be quick. The seamless stretchable knit sleeve should be capable of stretching to about two to three diameters compared to its rest size, with rather light stretch forces. Thus the requirements for readily applying the sleeve as a liner in accordance with the present invention are met, and the lining does not interfere with the intended use of the article, including the degree of stretch necessary when putting it on and taking it off. After the lining has stretched enough of those purposes, it desirably approaches the limit of its stretchability, well before the rubber sheath does, so the lining can and will act as a reinforcement to the rubber to prevent puncture or local tear. It is possible to puncture a rubber sheath by digging one's finger into it while pulling. This locally stretches it excessively and exerts concentrated force, which may puncture or tear the rubber. The fabric lining, with its more limited extent of ultimate elongation, reinforces against this.

*Depth of immersion of lining into adhesive layer.*—This depth can be controlled by letting the adhesive layer have a thickness corresponding to the desired depth of penetration, letting it be sufficiently fluid so that the bottoms of the fabric loops can be pressed to the bottom of that layer but not so fluid that it will wick up into the lining, and having sufficient pressure in the pressing operation to force the bottoms of the loops to the bottom of the layer. The requisite degree of immersion of the bottoms of the fabric loops and requisite thickness of bond can be obtained with other combinations by varying the relevant factors so long as they are varied in correct relation to each other. Factors influencing the immersion are:

The depth of the adhesive layer (the deeper the layer the thicker the bond);

Its viscosity (the more viscous the adhesive layer the thinner the bond), the viscosity itself being a function of the viscosity of the deposited latex and of the length of time between depositing the latex and applying the lining and also a function of the ambient humidity;

And the degree of pressure applied in pressing (the heavier the pressure the thicker the bond).

The lining must be sufficiently embedded in the adhesive so it will not peel off prematurely in service use, and it must not be embedded so deeply that the elasticity of the composite garment is too low to allow it to be readily put on and taken off the body.

To give good service use the lining should not peel off at a force of about five pounds per transverse inch of bond, measured when a one-inch sample has delamination initiated and the pulling force applied to the two spread laminae. To achieve this result the lining should be embedded not less than about two to three thousandths of an inch.

For the composite garment as a whole to have sufficient elasticity it should have a girthwise stretch such that application of a force of about three and a half pounds per transverse inch will stretch the girdle girthwise to at least about half again its original dimension, i.e. 50% elongation. To achieve this result in most of the garment's area, the lining should be embedded not more than about four to five thousandths of an inch measured when the adhesive layer has dried.

Thus it will be seen that in the girdle of our invention the seamless knit lining is embedded into the elastic adhesive layer of the seamless rubber sheath to a depth between a lower limit of about 0.002 to 0.003 inch and an upper limit of about 0.004 to 0.005 inch. These upper and lower limits should be observed with good consistency, as can be achieved with the radial advance of the sleeve into the adhesive as we here provided. Less stretch may be desired in certain areas of the garment, such as abdominal panels and the like. This may be achieved by locally immersing the lining to a greater depth. This can be done by using greater pressure in that locality, to flatten down the fabric loops and immerse greater portions of them in the adhesive. Good consistency should be observed in each area whether it has normal immersion or is a local area with extra immersion.

*Holding means.*—The clamping ring 44 of FIGURES 10 and 11 and the hooks 46 of FIGURES 13 and 14 are representative of any suitable holding means, there being a considerable variety of functional equivalents for this purpose. Also where relative movement is called for, either of the parts may move.

*Perforations.*—The rubber sheath of the girdle may be, and desirably is, provided with a large number of perforations. These may be made in the article after the lining has been attached to the rubber sheath, or they may be formed in the rubber sheath before the lining is attached.

We claim:

1. Method of making a seamless fabric linked rubber girdle comprising the steps of applying a semi-fluid elastic adhesive layer to the outer surface of a seamless rubber sheath, stretching a stretchable seamless tubular fabric sleeve to a larger outline than the rubber sheath, positioning the fabric sleeve so that it at least partially encircles the rubber sheath but is spaced therefrom, allowing the fabric sleeve to progressively longitudinally contract from one end to the other to completely surround the rubber sheath and make contact with the elastic adhesive by travel which is progressively longitudinal and substantially only perpendicular to the face of the elastic adhesive without laterally disturbing the adhesive layer, and pressing the fabric sleeve perpendicularly into the adhesive to embed the fabric sleeve to a depth of from 0.02 to 0.05 inch.

2. Method of claim 1 in which the stretched fabric sleeve is spaced from and completely encircles the rubber sheath before the fabric sleeve is allowed to progressively longitudinally contract.

3. Method of claim 1 in which the stretched fabric sleeve is spaced from and partially encircles the rubber sheath before the fabric sleeve is allowed to progressively contract, and one of said rubber sheath and fabric sleeve is moved longitudinally relative to the other while simultaneously allowing the fabric sleeve to progressively longitudinally contract.

4. Method of claim 1 in which the pressing is done with a roller.

5. Method of claim 1 in which the pressing is done with an air bladder.

6. Method of claim 1 in which thereafter the girdle is dried and the rubber is cured.

7. Method of claim 2 in which thereafter the girdle is dried and the rubber is cured.

8. Method of claim 3 in which thereafter the girdle is dried and the rubber is cured.

References Cited
UNITED STATES PATENTS 1,939,852  12/1933  Howard et al. _____ 156—287

ALEXANDER WYMAN, *Primary Examiner.*

W. J. VAN BALEN, *Assistant Examiner.*